United States Patent
Brockner et al.

(10) Patent No.: US 6,422,839 B1
(45) Date of Patent: Jul. 23, 2002

(54) CORROSIVE RESISTANT FUEL PUMP

(75) Inventors: Henry William Brockner, Detroit; Ronald A. Horvath, Milan; Christopher Conrad, Saline; Sharon Madley, Redford Township, all of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/449,089

(22) Filed: Nov. 24, 1999

(51) Int. Cl.[7] .......................... F04B 35/04; F04B 17/00; H02K 5/10; H02K 5/12
(52) U.S. Cl. ............................ 417/423.7; 417/410.1; 310/87; 310/88
(58) Field of Search ...................... 417/423.7, 410.1; 310/87, 88, 89, 71

(56) References Cited

U.S. PATENT DOCUMENTS

| | | | |
|---|---|---|---|
| 2,824,984 A | * 2/1958 | Harris | 310/87 |
| 3,318,249 A | * 5/1967 | Loeser | 103/25 |
| 3,436,880 A | 4/1969 | Kifer | 52/58 |
| 3,457,867 A | * 7/1969 | Komor et al. | 103/87 |
| 3,468,346 A | 9/1969 | Onifer, Jr. et al. | 138/109 |
| 3,498,319 A | 3/1970 | Schnabel | 137/375 |
| 3,597,820 A | 8/1971 | Schenck, Jr. | 29/157.1 R |
| 4,146,050 A | 3/1979 | Graves | 137/375 |
| 4,152,578 A | * 5/1979 | Jacobs | 219/336 |
| 4,303,094 A | 12/1981 | Rothwell et al. | 137/375 |
| 4,500,270 A | 2/1985 | Tuckey | 418/133 |
| 4,549,105 A | * 10/1985 | Yamamoto et al. | 310/87 |
| 4,596,519 A | 6/1986 | Tuckey | 418/15 |
| 4,626,721 A | * 12/1986 | Ouchi | 310/71 |
| 4,750,518 A | 6/1988 | Griffin et al. | 137/565 |
| 4,944,325 A | 7/1990 | Baldwin et al. | 137/375 |
| 5,013,222 A | 5/1991 | Sokol et al. | 417/366 |
| 5,056,492 A | 10/1991 | Banse | 123/509 |
| 5,175,464 A | * 12/1992 | Smith | 310/239 |
| 5,189,782 A | 3/1993 | Hickey | 29/602.1 |
| 5,220,301 A | * 6/1993 | Haas et al. | 335/278 |
| 5,425,625 A | 6/1995 | Hsu | 417/277 |
| 5,465,910 A | * 11/1995 | Hall et al. | 239/585 |
| 5,513,613 A | * 5/1996 | Taylor et al. | 123/456 |
| 5,520,221 A | 5/1996 | Meier | 138/109 |
| 5,608,963 A | 3/1997 | Lefere | 29/525.01 |
| 5,622,394 A | 4/1997 | Soles et al. | 285/256 |
| 5,697,769 A | 12/1997 | Kobman et al. | 417/410.1 |

OTHER PUBLICATIONS

Modren Plastics Encyclopedia '92, McGraw Hill Inc. p. 12, Oct. 1992.*

* cited by examiner

Primary Examiner—Michael Koczo
Assistant Examiner—Timothy P. Solak

(57) ABSTRACT

An electric fuel pump (10), including a housing (12), an inlet (14), an outlet (16), a means for transmitting fluid from the inlet to the outlet (18), an electrical motor (20), two brushes to transmit electrical current to the motor (22), two electric terminals (23) to transmit current to the two brushes (22) from a wire harness (24) connecting the terminals (23) with outside controls, and a protective covering of thermoplastic (26) bonded to said terminals. The protective covering of thermoplastic prevents corrosion of the terminals (23).

3 Claims, 2 Drawing Sheets

CORROSIVE RESISTANT FUEL PUMP

TECHNICAL FIELD

The present invention relates generally to fuel pumps and more particularly to fuel pump devices which reduce corrosion of the outlet terminals.

BACKGROUND ART

Fuel pumps are commonly used to transfer fuel from a remotely positioned fuel tank to an internal combustion engine. Many different types of fuel pumps are known for accomplishing this purpose. One of the more well known fuel pumps is an electric fuel pump. Current electric fuel pumps are typically positioned within the fuel tank and secured therein. These fuel pumps are typically connected to a power and control source which is located outside the fuel tank. The power and control source is typically connected to the fuel pump by a wire harness. The wire harness is attached to the electric fuel pump with electrical contacts.

The electrical contacts are typically exposed to fuel which can corrode the exposed area. Corrosion can cause durability issues for the electric fuel pump. Durability issues can result in increased costs and shortened life of the electric fuel pump.

As a result, durability is a primary concern of fuel pump design for use in automotive applications. Current designs, however, are frequently unable to provide the desired long life without the need for replacement parts or repair. Current design solutions include the use of press-fit plastic caps and rubber seals or O-rings. While these solutions have the effect of reducing contact with the fuel, they often allow some leakage when subjected to the vibrations and impacts of the automotive environment.

The introduction of flexible fuels makes achieving the desired durability even more difficult. Flexible fuels include corrosive fuels such as alcohol, methanol, and ethanol. Even minimal exposure to such fuels can lead to the rapid corrosion and failure of materials such as those used in the electrical connections that connect the electrical fuel pump to the wire harness. Even the small amount of leakage found in current designs can significantly reduce the life of a fuel pump in a corrosive environment. As the demand for flexible and alternative fuels continues to grow, the need for a fuel pump that can withstand the corrosive environment of these fuels is a necessity.

SUMMARY OF THE INVENTION

It is therefore the object of the present invention to provide an electrical outlet assembly for a fuel pump that significantly reduces exposure of the terminals to fuel. It is a further object of the present invention to provide an electrical outlet assembly for a fuel pump that prevents corrosion when used in the highly corrosive environment of flexible fuels.

In accordance with the objects of the present invention, an improved electrical fuel pump assembly is provided. The fuel pump includes a pump housing disposed in a fuel tank. The pump housing contains an inlet opening allowing fuel to enter the pump and an outlet opening allowing expulsion of fuel therefrom. A pumping apparatus, located within the pump housing and powered by an electric motor, forces the fuel into the inlet opening and out of the outlet opening. The electric motor, positioned within the pump housing, contains electrical terminals that mate outside the pump housing with a power source to supply power to the electric motor. The mating takes the form of a wire harness connecting the electrical terminals to the power source. A protective coating of thermoplastic covers the terminals and their connections to the wire harness to prevent contact with the fuel in the fuel tank.

The protective coating covering the terminals and their connection to the wire harness is applied through the use of an overmold process. The process consists of connecting the wire harness with the outlet assembly and inserting the combination into a mold cavity. The edges of the mold cavity are sealed and a thermoplastic resin is injected between the mold and the outlet assembly. The result is a thermoplastic coating that seals the entire electrical outlet assembly and its connection to the wire harness.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
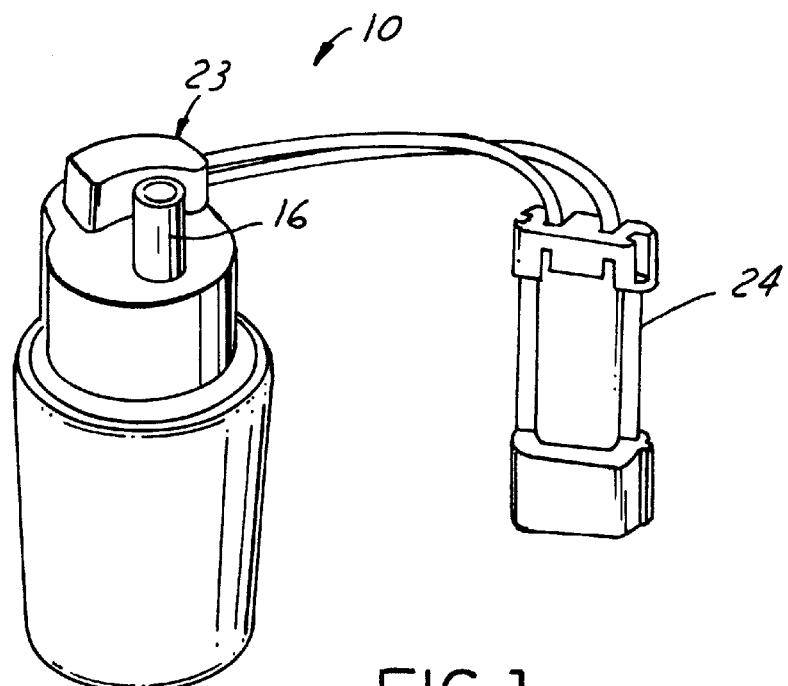
FIG. 1 is a schematic view of a fuel pump in accordance with a preferred embodiment of the present invention.

Referring now to FIG. 1, which is a schematic view of an electric fuel pump 10 in accordance with the present invention. The disclosed electric fuel pump 10 is preferably for use in automotive applications. However, the disclosed electric fuel pump 10 may be used in a variety of other applications, including non-automotive applications. The disclosed electric fuel pump 10 is preferably for use in flexible fuel applications due to its corrosion resistant properties. However, the disclosed electric fuel pump 10 may be used in a variety of fuel applications, including standard fuel applications.

Figure 4:
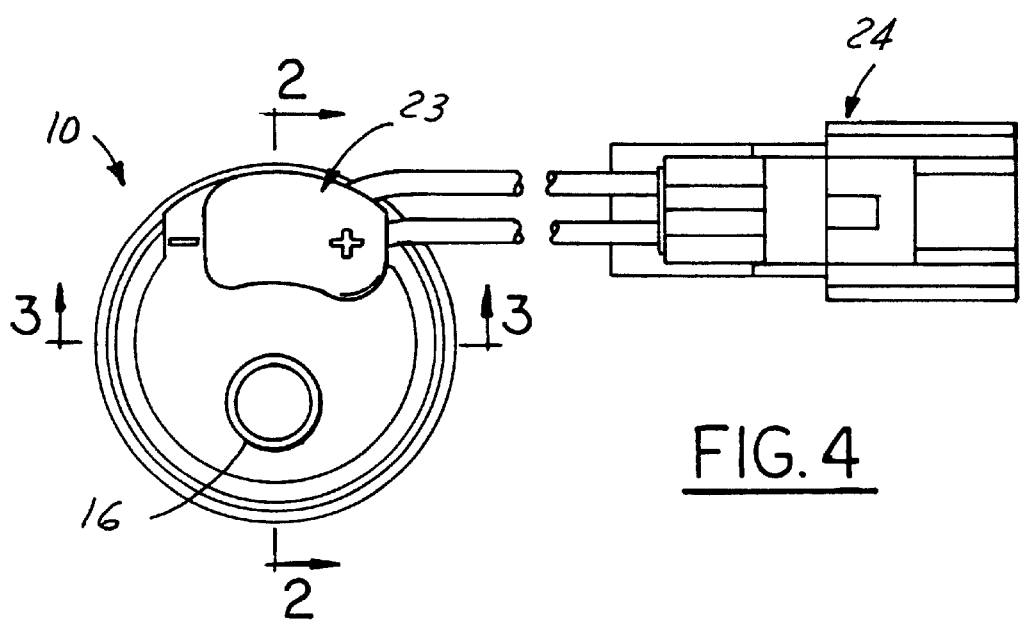
FIG. 4 is a top view of the fuel pump illustrated in FIG. 1.
Figure 2:
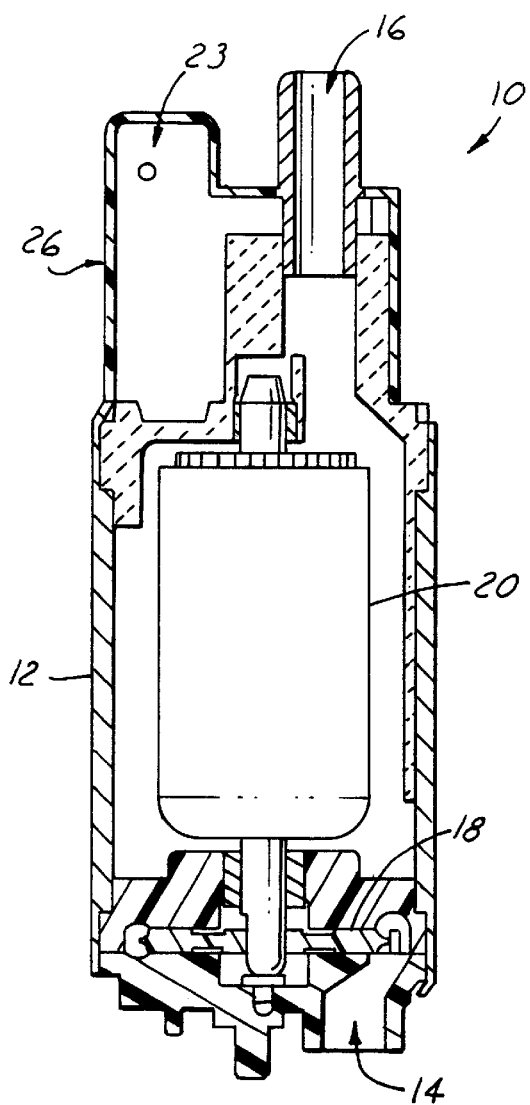
FIG. 2 is a cross-sectional view of the fuel pump illustrated in FIGS. 1 and 4, the cross-section being taken along line A—A in FIG. 4 and in the direction of the arrows.
Figure 3:
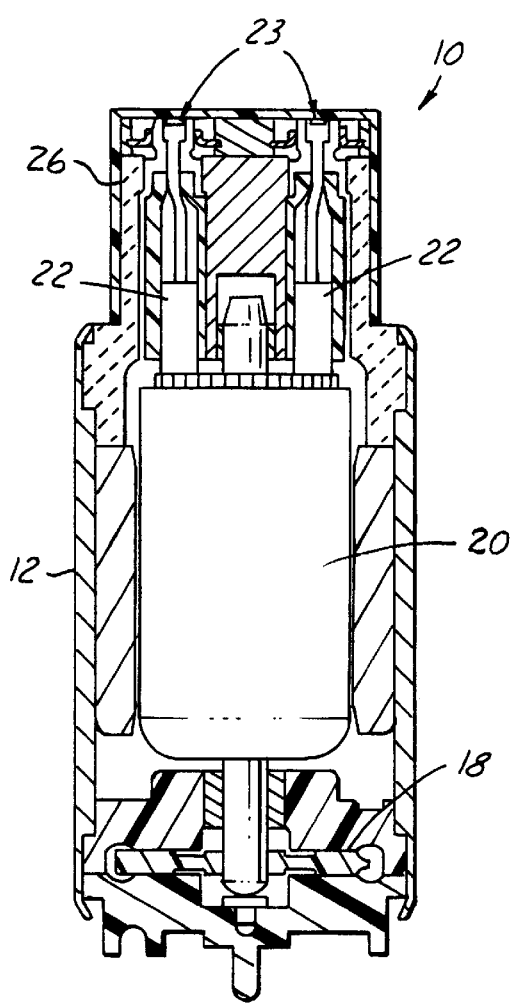
FIG. 3 is a cross-sectional view of the fuel pump illustrated in FIGS. 1 and 4, the cross-section being taken along line B—B in FIG. 4 and in the direction of the arrows.

Referring now to FIG. 2, the electric fuel pump 10 includes a housing 12 that is to be positioned in an automotive fuel tank. The housing 12 contains an inlet 14 for fuel to enter the pump 10 and an outlet 16 for expelling the fuel. A pumping apparatus 18, is located within the pump housing 12 and is powered by an electric motor 20. The pumping apparatus 18 forces the fuel into the inlet 14 and out of the outlet 16. The electric motor 20, positioned within the pump housing 12, contains two brushes 22 (best viewed in FIG. 3) that connect with two electric terminals 23. The two electric terminals 23 connect to a wire harness 24 (best viewed in FIG. 4). The wire harness 24 transmits power through the two electric terminals 23 and the two brushes 22 to the electric motor 20 from a source outside the fuel tank. A protective coating of thermoplastic 26 covers the two electric terminals 23 and their connection to the wire harness 24 to prevent their exposure to fuel in the tank.

The protective coating of thermoplastic 26 is applied through an overmold process. In the preferred embodiment, the wire harness 24 is attached to the electric terminals 23 and then the combination is inserted into a mold cavity. The edges of the mold cavity are then sealed and a thermoplastic resin is injected between mold cavity and the electric terminals 23. The result is a protective thermoplastic coating 26 that seals the entire electrical terminal assembly 23 and its connection to the wire harness 14. The protective thermoplastic coating 26 is more robust than present designs and provides a better barrier against corrosive fuel such as those found in flexible fuel automotive applications.

In the preferred embodiment, the protective thermoplastic coating 26 is composed of acetel thermoplastic resin with a minimum thickness of one (1) millimeter. The preferred embodiment of the invention uses Celcon, M450 as its acetel thermoplastic resin. The minimum thickness of the protective thermoplastic resin is dependent upon the type of thermoplastic used. The minimum thickness is based upon the thermoplastic materials ability to cover corners without cracking.

While particular embodiments of the invention have been shown and described, numerous variations and alternate embodiments will occur to those skilled in the art. Accordingly, it is intended that the invention be limited only in terms of the appended claims.

What is claimed is:

1. A method of protecting a fuel pump assembly from corrosion, the fuel pump comprising a pump housing, a fluid inlet, a fluid outlet, a pumping apparatus, an electric motor, a plurality of connecting terminals, a wire harness, and a protective coating, comprising the steps of:

mating said plurality of connecting terminals with said wire harness;

inserting said plurality of connecting terminals mated with said wire harness into an overmold;

sealing the edges of said mated plurality of connecting terminals that project from the overmold;

injecting an acetel thermoplastic resin between said overmold and said mated plurality of connecting terminals;

letting said acetel thermoplastic resin set around said mated plurality of connecting terminals; and removing said plurality of connecting terminals with said protective coating of acetel thermoplastic resin from the overmold.

2. The method of claim 1, wherein said acetel thermoplastic resin is Celcon, M450.

3. The method as set forth in claim 1 wherein said acetel thermoplastic resin is at least one millimeter in thickness.

\* \* \* \* \*